United States Patent
Mrotzek et al.

(10) Patent No.: US 10,065,271 B2
(45) Date of Patent: Sep. 4, 2018

(54) METHOD FOR PRODUCING A ROLL-CLAD ALUMINUM WORKPIECE, ROLL-CLAD ALUMINUM WORKPIECE, AND USE THEREFOR

(71) Applicants: Manfred Mrotzek, Buxtehude (DE); Marcel Lansing, Hamburg (DE)

(72) Inventors: Manfred Mrotzek, Buxtehude (DE); Marcel Lansing, Hamburg (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

(21) Appl. No.: 14/850,612

(22) Filed: Sep. 10, 2015

(65) Prior Publication Data
US 2015/0375345 A1 Dec. 31, 2015

Related U.S. Application Data

(63) Continuation of application No. PCT/EP2014/055413, filed on Mar. 18, 2014.

(51) Int. Cl.
*B23K 31/02* (2006.01)
*B23K 35/00* (2006.01)
(Continued)

(52) U.S. Cl.
CPC .......... *B23K 35/002* (2013.01); *B21C 37/151* (2013.01); *B23K 1/0008* (2013.01);
(Continued)

(58) Field of Classification Search
CPC ...... B23K 35/002; B23K 1/20; B23K 1/0008; B23K 35/0222; B23K 35/286;
(Continued)

(56) References Cited

U.S. PATENT DOCUMENTS 2,706,328 A * 4/1955 Karmazin ............. B21C 37/087
138/171
2,941,282 A 6/1960 Fromson
(Continued)

FOREIGN PATENT DOCUMENTS

CA 1 229 960 A1 12/1987
CA 2 185 884 A1 10/1995
(Continued)

OTHER PUBLICATIONS

Translation of JP-1178391A (no date available).*
Machine translation of JP 2008-013844A (no date available).*
Machine translation of JP 01-254377A (no date available).*

*Primary Examiner* — Kiley Stoner
(74) *Attorney, Agent, or Firm* — Reinhart Boerner Van Deuren P.C.

(57) ABSTRACT

A method for producing a roll-clad aluminum workpiece and an associated roll-clad aluminum workpiece are provided, wherein a core ingot is produced from an aluminum alloy and at least one cladding piece is produced from a cladding material, wherein at least one groove is introduced into the core ingot and/or into a layer applied to the core ingot, wherein the cladding piece is inserted into the groove, and wherein the core ingot is hot-rolled after the cladding piece has been inserted, the width of the groove being equal to or less than the core ingot width. A use of such a roll-clad aluminum workpiece is also provided for producing a soldered workpiece, in particular a folding tube.

18 Claims, 5 Drawing Sheets

US 10,065,271 B2
Page 2

(51) Int. Cl.
*B23K 35/28* (2006.01)
*B23K 20/04* (2006.01)
*B23K 35/02* (2006.01)
*B32B 15/01* (2006.01)
*B21C 37/15* (2006.01)
*B23K 1/00* (2006.01)
*B23K 1/20* (2006.01)
*F28D 1/03* (2006.01)
*B23K 103/10* (2006.01)
*F28F 21/08* (2006.01)

(52) U.S. Cl.
CPC .............. *B23K 1/20* (2013.01); *B23K 20/04* (2013.01); *B23K 35/0222* (2013.01); *B23K 35/0238* (2013.01); *B23K 35/286* (2013.01); *B32B 15/016* (2013.01); *B23K 2203/10* (2013.01); *F28D 1/0391* (2013.01); *F28F 21/084* (2013.01); *F28F 21/089* (2013.01)

(58) Field of Classification Search
CPC .......................... B23K 35/0238; B23K 20/04; B23K 2203/10; B23K 35/0233–35/0244; B23K 20/103; B32B 15/016; B21C 37/15; F28F 21/089; F28F 21/084; F28D 1/0391
USPC ............. 228/115–117, 235.1–235.3, 3.1, 17, 228/245–255, 56.3
See application file for complete search history.

(56) References Cited

U.S. PATENT DOCUMENTS

| | | | |
|---|---|---|---|
| 5,495,656 A | 3/1996 | Waggoner | |
| 6,230,533 B1* | 5/2001 | Laveran | B21C 37/14 165/177 |
| 6,251,527 B1* | 6/2001 | Schelin | B32B 15/016 428/582 |
| 6,412,174 B1 | 7/2002 | Kawano et al. | |
| 2004/0007040 A1* | 1/2004 | Ibron | B21C 37/083 72/379.2 |
| 2004/0056071 A1* | 3/2004 | Pohlman | B23K 35/0238 228/175 |
| 2006/0105193 A1* | 5/2006 | Burger | B23K 35/00 428/654 |
| 2006/0186178 A1* | 8/2006 | Bauder | B21B 1/38 228/117 |
| 2007/0034366 A1* | 2/2007 | Igami | F28D 1/0391 165/177 |
| 2009/0020276 A1* | 1/2009 | Ueda | B23K 35/0233 165/177 |
| 2011/0284195 A1* | 11/2011 | Chowdhury | F28D 1/0391 165/174 |
| 2013/0180694 A1* | 7/2013 | Englert | B21C 37/14 165/168 |
| 2013/0277034 A1* | 10/2013 | Iwata | B23K 1/20 165/185 |
| 2015/0004428 A1* | 1/2015 | Kamiya | B23K 1/19 428/576 |
| 2015/0068715 A1* | 3/2015 | Raver | B21D 53/085 165/151 |

FOREIGN PATENT DOCUMENTS

| | | |
|---|---|---|
| CA | 2428660 A1 | 5/2002 |
| CA | 2509322 C | 12/2008 |
| CA | 2467584 C | 8/2010 |
| CA | 2 671 916 C | 8/2013 |
| CA | 2717372 C | 6/2015 |
| CN | 1993199 A | 7/2007 |
| DE | 600 06 567 T2 | 9/2004 |
| DE | 600 21 619 T2 | 6/2006 |
| EP | 1 221 366 A1 | 7/2002 |
| JP | 55-070490 A | 5/1980 |
| JP | 58-65595 A | 4/1983 |
| JP | 60-6287 A | 1/1985 |
| JP | 61-176485 A | 8/1986 |
| JP | 61-262475 A | 11/1986 |
| JP | 62-013282 A | 1/1987 |
| JP | 63-123583 A | 5/1988 |
| JP | 01178391 A * | 7/1989 |
| JP | 01-254377 A | 10/1989 |
| JP | 03060880 A * | 3/1991 |
| JP | 06-304745 A | 11/1994 |
| JP | 10193013 A * | 7/1998 ........... F28D 1/0391 |
| JP | 11106855 A * | 4/1999 ........... F28D 1/0391 |
| JP | WO 9916920 A1 * | 4/1999 ........... F28D 1/0391 |
| JP | 2000-161883 A | 6/2000 |
| JP | 2004053128 A * | 2/2004 ........... F28D 1/0391 |
| JP | 2006-346730 A | 12/2006 |
| JP | 2008-013844 A | 1/2008 |
| JP | 2008-502486 A | 1/2008 |
| WO | WO 2012/098233 A2 | 7/2012 |

* cited by examiner

METHOD FOR PRODUCING A ROLL-CLAD ALUMINUM WORKPIECE, ROLL-CLAD ALUMINUM WORKPIECE, AND USE THEREFOR

CROSS-REFERENCE TO RELATED PATENT APPLICATIONS

This patent application is a continuation of PCT/EP2014/055413, filed Mar. 18, 2014, which claims priority to German Application No. 2013 102 821.7, filed Mar. 19, 2013, the entire teachings and disclosure of which are incorporated herein by reference thereto.

FIELD OF THE INVENTION

The invention relates to a method for producing a roll-clad aluminum workpiece. The invention furthermore relates to a roll-clad aluminum workpiece having a core of an aluminum alloy and at least one cladding layer of a cladding material on one side of the aluminum workpiece. Finally, the invention also relates to a use of such a roll-clad aluminum workpiece.

BACKGROUND OF THE INVENTION

A number of methods for applying a cladding layer to aluminum strips or sheets, respectively, are known from the prior art.

In roll-cladding, sheets are made from a cladding material and placed on a core ingot. The sheets and the core ingot are then hot-rolled to form a composite material. However, only holohedral cladding layers having in each case a single thickness and alloy composition per layer may be produced using this method. Cladding of only a partial area or a cladding layer which selectively has different thicknesses across the ingot width or length, or is composed of a plurality of alloys of various compositions has not been possible to date, since this would lead to extremely asymmetrical balances of forces in the rolling gap, such that a very irregular or warped product, respectively, would be produced, or the roll stand could even be damaged.

In cast cladding, a cladding layer is directly cast onto a core ingot while the latter is being cast. The core ingot in its original form is thus directly formed as a composite material. Even with this method, only holohedral cladding layers having a single thickness and of a single alloy may be produced, since the rolled ingot, i.e. the core ingot having the layer applied, otherwise would not have a planar but rather a stepped rolled face.

A further possibility for applying cladding layers lies in the use of brazing pastes which are mechanically or manually applied using cannulas during the processing of the aluminum strips and sheets. This method has the disadvantage that the carrier substance of the brazing paste has to be removed without residue prior to brazing the workpiece, for example by way of evaporation, which on account of insufficient ventilation is problematic in particular in the case of closed structures. Furthermore, only very narrow regions can be coated using the brazing pastes, and the thickness of the solder layer can also only be controlled in a comparatively crude manner by way of the amount of paste or the composition of the latter, respectively.

A further alternative lies in the use of a brazing foil which, however, is rather expensive. Furthermore, the brazing foil typically has to be manually applied onto the workpiece in a complex fashion. Moreover, the brazing foil is also suitable only for comparatively large material thicknesses, since the brazing foil otherwise would be very thin and extremely difficult to process. Any application of the brazing foil to very small regions is hardly manageable in technical terms.

There besides, further methods which are less widely used, for example explosive cladding, cold-roll cladding, or similar methods are known in the prior art. However, all of these methods are complex and expensive. Furthermore, only holohedral cladding layers having a single thickness and alloy composition on the surface may be produced using these methods in conjunction with hot-rolled strips.

Furthermore, DE 600 06 567 T2 discloses the production of an integral aluminum alloy structure in which an inlay is inlayed into a fluted bed of a core and is then connected thereto by hot rolling. On account thereof, scabs on the edges of the structure are to be avoided.

Using most of the afore-described methods, in particular hot-roll cladding which is widely used, only holohedral cladding layers across the entire strip may be produced. Other methods are very complex or not economical.

A holohedral cladding layer is not required or is even often disadvantageous in many applications.

For example, a solder coating is only required in specific regions of a component made from a strip or a metal sheet. However, when the strip and thus also the component produced therefrom as a consequence of the process is completely coated with solder, more solder may accumulate at the brazing point than is required for brazing, such that erosions or other undesirable effects may arise. Moreover, in the case of a holohedral solder coating, unintentionally brazed connections of two components which are disposed so as to be close to one another may arise.

Furthermore, many cladding layers are more ignoble than the core alloy and thus more prone to corrosion. On account thereof, increased material removal due to corrosion may arise. Furthermore, cladding layers such as solder coatings typically have a visually less appealing surface than non-clad surface regions. Furthermore, solder coatings of AlSi alloys often have large Si depositions which have a disadvantageous effect during deformation of the strips, since they may induce cracks and reduce elongation at break.

SUMMARY OF THE INVENTION

In view of this background, the present invention is based on the object of providing an economical method for producing a roll-clad aluminum workpiece having a part-area clad coating, and a corresponding roll-clad aluminum workpiece. A further object lies in increasing flexibility in the design of the cladding layers, in particular in relation to various thicknesses or alloy compositions of the cladding layers.

The afore-described objects are at least partially achieved according to the invention by a method for producing a roll-clad aluminum workpiece, in which a core ingot of an aluminum alloy and at least one cladding piece of a cladding material are provided, in which at least one groove is incorporated into the core ingot and/or into a layer which may have been applied to the core ingot, in which the cladding piece is inlayed into the groove, and in which the core ingot, after inlaying of the cladding piece, is hot-rolled.

Using this method, roll-clad aluminum workpieces which have a part-area cladding layer, that is to say a cladding layer which in contrast to a holohedral cladding layer extends only across part of the surface of the aluminum workpiece, can be produced. The method is thus in particular a method for producing a roll-clad aluminum workpiece having at least one cladding layer which extends only across a part-region of one side of the aluminum workpiece.

On account thereof, it may be achieved inter alia that the cladding material used for the cladding layer is applied only in the amount required for the functioning of the cladding layer and/or is applied only at the required points onto the aluminum workpiece. In the case of a solder cladding, the cladding layer may be applied in the amount required for brazing of the aluminum workpiece, for example, such that excessive solder erosion can be prevented. Furthermore, uniform thickness of the cladding layer may be achieved using this method, since the effect of a cladding layer thickness which decreases due to rolling may be reduced or even avoided. In this way, the amount of shed waste may also be reduced.

The term aluminum workpiece is presently and hereunder understood in particular to be an aluminum strip or an aluminum sheet. The term aluminum workpiece furthermore also comprises semi-finished products or products made from such strips or metal sheets.

According to the method, a core ingot of an aluminum alloy is provided. Examples for often used aluminum alloys for this purpose include: AA (Aluminum Association) 3xxx, in particular AA 3003, AA 3005, AA 3103, and AA 3105, and AA 6xxx, in particular AA 6063, as well as their respective modifications. The core ingot may be originally formed by die casting, for example. The rolled surfaces of the core ingot, that is to say the upper and lower side thereof, are preferably prepared for rolling, in particular milled.

The core ingot used in the method preferably has a thickness of 300 to 700 mm and/or a width of 500 to 3000 mm and/or a length of 3000 to 8000 mm.

A groove is then incorporated into the core ingot and/or into a layer which may have been applied to the core ingot. The groove may be milled, for example. If the core ingot already has a layer which has been applied, for example a cladding layer, the groove may also be incorporated into this layer. If the depth of the groove exceeds the thickness of the layer applied, the groove may be incorporated into the applied layer as well as into the core ingot lying therebelow.

The depth, length, and width of the groove are preferably adapted to the dimensions of the cladding piece to be inserted. The groove is preferably incorporated in the longitudinal direction of the core ingot, that is to say that the longitudinal extent of the groove preferably runs substantially in the longitudinal direction of the core ingot. In principle, the groove may have any arbitrary shape. The shape of the groove is understood to be the shape of the groove in the plane of the surface of the core ingot or in the layer applied thereon, respectively. In terms of process technology, a rectangular shape of the joint is preferable, wherein the longer edges of the rectangular shape preferably run substantially in the longitudinal direction of the core ingot.

A groove is presently understood to be a depression in the surface of the core ingot, or in a layer applied thereupon, respectively, into which a cladding piece may be inlayed. To this end the groove preferably has a groove base which is laterally delimited by at least one groove wall in at least one direction, preferably on two mutually opposite sides of the groove. The groove base may be configured so as to be planar and parallel with the surface of the core ingot, for example. However, said groove base may also be shaped so as to be oblique, stepped, undulated, or shaped in any other way. Preferably, the groove base is laterally delimited by a groove wall on two mutually opposite sides. In one direction of extent, in particular in the longitudinal extent thereof, the groove may be configured to be unilaterally or bilaterally continuous, that is to say without a groove wall delimiting the groove in this direction, or be unilaterally or bilaterally offset from the edge of the core ingot, that is to say having a unilateral or bilateral groove wall in this direction. The groove preferably extends across the entire length of the core ingot. Alternatively, the groove may also extend across only part of the core ingot length.

According to the method, a cladding piece of a cladding material is provided. The cladding piece may be produced from a sheet of cladding material by sawing and/or milling, for example. Sheets of this type may be provided by sawing or hot rolling, for example. The cladding material is a material which differs from the material of the core ingot in at least one property. Examples of cladding materials include: solder cladding materials such as AlSi alloys, in particular AA 4045, AA 4047, AA 4343, AA 4004, or AA 4104, corrosion-protection cladding materials such as AA 1050 or AA 7072, or cladding materials for improving visual appearance, such as AA 1050 or AA 3003.

The groove, or the cladding piece, respectively, preferably has a width (that is to say an extent in the transverse direction of the core ingot) of at least 1 mm, preferably of at least 3 mm, more preferably of at least 5 mm, in particular of at least 10 mm. The width of the groove, or of the cladding piece, respectively, is preferably equal to or less than 95%, preferably less than 90%, in particular less than 85%, of the core ingot width.

The width of the groove, or of the cladding piece, respectively, is preferably adapted so as to be specific to the application. Thus the width of the groove, or of the cladding piece, respectively, in particular may also be at maximum 80%, at maximum 70%, at maximum 60%, at maximum 50%, at maximum 40%, at maximum 30%, at maximum 20%, or even only at maximum 10% of the core ingot width.

Furthermore, the groove preferably has a depth of at least 1%, preferably at least 3%, and further preferably of at most 30% of the core ingot thickness, or of the total thickness of core ingot plus layer clad thereupon. The cladding piece preferably has a thickness of at least 1%, preferably of at least 3%, and more preferably a thickness of up to 40% of the core ingot thickness, or of the total thickness of core ingot plus layer clad thereupon.

After the cladding piece has been inlayed into the groove, the cladding piece in the groove may optionally be secured against falling off, for example by clamping, by welding, or by way of an adhesive means, until the core ingot is hot-rolled.

On account of the cladding piece being inlayed into the groove it is achieved that the core ingot, or a layer applied onto the core ingot, respectively, is at least in part conjointly rolled during subsequent hot rolling. On account thereof, the risk of the cladding piece, or of the core ingot, respectively, being twisted, and the risk of excessive warping are reduced. Part-area cladding layers may thus be produced by hot rolling in a reliable process by way of the method.

During hot rolling of the core ingot, the cladding piece is clad onto the core ingot, that is to say connected thereto in a materially-integral, force-fitting, and/or form-fitting manner, such that a roll-clad aluminum workpiece having a part-area cladding layer is provided.

Hot rolling is preferably performed to a thickness in the range of 1.0 mm, preferably of 2.0 mm, to 20 mm, preferably to 10 mm. The cladding layers after hot rolling preferably have a thickness in the range of 0.01 mm to 6 mm, preferably to 3 mm.

After hot rolling, the strips may be cold-rolled to a lesser final thickness in one or a plurality of cold rolling passes, wherein one or more annealing operations may be performed between the rolling stages or thereafter. Cold rolling is preferably performed to a final thickness in the range of 0.05 mm, preferably of 0.5 mm, to 20 mm, preferably to 10 mm, more preferably to 5 mm, in particular to 1 mm. The cladding layers after cold rolling preferably have a thickness in the range of 0.005 mm to 1 mm, preferably to 0.5 mm.

Preferably between hot rolling and cold rolling, or after cold rolling to the final thickness, the strips may be cut to the final width. For this purpose, the location and width of the cladding layers are preferably determined first, so as for said location and width to be considered when cutting. The location of the groove and of the cladding pieces which are inlayed in the groove preferably may already be adapted to the later final width of the strip prior to the groove being incorporated.

In an embodiment of the method, the at least one cladding piece has a width equal to or less than 50%, preferably equal to or less than 40%, in particular equal to or less than 25% of the core ingot width. The width of the cladding piece is understood to be the maximum extent of the cladding piece, transverse to the direction of longitudinal extent of the core ingot.

In this way, the size and/or the arrangement of the cladding layer produced from the cladding piece may be adapted to the respective application of the roll-clad aluminum workpiece which has been produced using this method. In particular, negative consequences in the processing of the roll-clad aluminum workpieces, for example on account of an excess of cladding material, may be avoided.

If a plurality of cladding pieces are inlayed into the at least one groove or in a plurality of grooves in the method, preferably a plurality of cladding pieces, in particular all these cladding pieces, in each case have a width equal to or less than 50%, preferably equal to or less than 40%, in particular equal to or less than 25% of the core ingot width.

The at least one groove into which the at least one cladding piece is inlayed is preferably adapted to the width of the cladding workpiece, and in particular has a width equal to or less than 50%, preferably equal to or less than 40%, and in particular equal to or less than 30% of the core ingot width.

In a further embodiment of the method, the cladding piece is composed of a brazing alloy, preferably of an alloy of the type AA 4xxx. In this way, a roll-clad aluminum workpiece having a part-area solder cladding layer may be produced. The amount of solder may preferably be measured such that an excess of solder during the brazing operation, having the afore-described disadvantages, is prevented. Furthermore, it may be achieved by way of a smaller solder proportion in the aluminum workpiece produced that the waste which accrues during production, that is to say the scrap which accrues during cladding, contains a smaller proportion of solder and thus is more readily recyclable. Furthermore, by way of the part-area solder coating, corrosion of the workpiece in general may be reduced in relation to workpieces which are solder-clad in a holohedral manner. Finally, on account of the part-area solder cladding layer, an altogether more attractive surface of the aluminum workpiece may be achieved.

In a further embodiment of the method the cladding piece is adapted so as to exactly fit the shape of the groove. The shape of the groove here is understood as the shape of the groove in the surface of the core ingot, or in the layer applied thereonto, respectively. In the case of a rectangular shape of the groove, a rectangular cladding piece with substantially the same width and the same length is preferably used for example. On account of this adapting for an exact fit, irregularities in the edge thickness of the aluminum workpiece produced may be reduced, and slippage of the cladding piece during hot rolling may be prevented.

In a further embodiment of the method the thickness of the cladding piece substantially corresponds to the depth of the groove. This is particularly advantageous when the cladding material and the material of the core ingot have a similar resistance to forming. This embodiment has the advantage that uniform hot rolling is performed, since the roller simultaneously contacts the core ingot, or a layer applied onto the core ingot, respectively, and the cladding piece.

In a further embodiment of the method the cladding piece and the core ingot have a different resistance to forming, wherein the thickness of the cladding piece preferably is larger than the depth of the groove if the cladding piece has a lower resistance to forming than the core ingot, and/or wherein the thickness of the cladding piece furthermore preferably is smaller than the depth of the groove if the cladding piece has a higher resistance to forming than the core ingot. In this way, the thickness of the cladding piece is adapted to the resistance to forming thereof and thus to the rolling behavior thereof. Cladding pieces having a higher resistance to forming have lower deformation at the same rolling force than cladding piece with a lower resistance to forming. In particular, it is prevented by way of this embodiment that the different resistances to forming lead to problems in hot rolling. It may furthermore be achieved in this way that the aluminum workpiece has a uniform thickness in the clad and in the non-clad regions.

The resistance to forming is understood to be the resistance of deformation $k_w$ which is a result of the deformation strength $k_f$ under consideration of all influences of friction during rolling.

In a further embodiment of the method the cladding piece which is inlayed into the groove is spaced apart from the longitudinal edges of the core ingot, preferably having a spacing of at least 1 cm, preferably at least 2 cm, in particular at least 5 cm. On account thereof, the cladding piece can be prevented from breaking out at the strip periphery during hot rolling. Furthermore, in this way also spacing apart of the cladding layer from the longitudinal edges of the hot strip is achievable, so that thinning of the cladding layer at the strip periphery due to hot rolling is reduced, and beading as well as beading scrap can be reduced. The groove may also be spaced apart from the longitudinal edges of the core ingot, preferably at least by the aforementioned spacings.

A further embodiment follows from one of the afore-described methods, in which a first cladding piece of a cladding material and a second cladding piece of a cladding material are provided, in which at least one first groove is incorporated into the core ingot and/or into a layer which may have been applied to the core ingot, in which the first cladding piece is inlayed into the first groove, in which the second cladding piece is inlayed into the first or into a second groove which is incorporated into the core ingot and/or into a layer which may have been applied to the core ingot, and in which the core ingot, after inlaying of the first and second cladding piece, is hot-rolled.

In this way, roll-clad aluminum workpieces which have a plurality of cladding layers, in particular cladding layers of different types, on one side may be produced. Thus, cladding layers having different functionalities may be produced on one side of the workpiece produced.

According to the afore-described embodiment, the first cladding piece is inlayed into the first groove. The second cladding piece then may likewise be inlayed into the first groove, in particularly directly beside the first cladding piece, or spaced apart from the first cladding piece. If the second cladding piece is inlayed into the groove so as to be spaced apart from the first cladding piece, a separator of the material of the core ingot as a separate divider web is preferably interdisposed between the first and the second cladding piece. Alternatively, the second cladding piece may also be inlayed into a second groove which is incorporated into the core ingot, or into a layer which may have been applied onto the core ingot, respectively, and in particular specifically on the same side of the core ingot as the first groove.

For example, if a first and a second groove are incorporated, they may be disposed so as to be directly beside one another or else spaced apart from one another, with or without a divider web. If the two grooves are incorporated directly beside one another without a divider web, a comparatively large groove results on account thereof, which comparatively large groove may be considered to be a unifying groove of the two grooves. If the two grooves have different depths, the unifying groove has two corresponding regions having different depths with a stepped groove base, for example.

Accordingly, the first and the second cladding piece may be disposed so as to be directly beside one another or spaced apart from one another, with or without a divider web. A divider web is understood to be a narrow web of the core ingot, or of a layer which may have been applied onto the core ingot, respectively, by way of which web the first and the second groove are mutually separated. Alternatively, the divider web may also be provided as a separate divider part of the material of the core ingot, or of a layer which may have been applied onto the core ingot, respectively.

In the incorporation of a first and a second groove, the grooves may have the same depth or else different depths. In this way, the depths of the groove may be individually adapted to the depth and/or to the resistance to forming of the respective cladding pieces, for example.

In a further embodiment of the method, initially a first and subsequently at least one second cladding piece are inlayed into a groove which is incorporated into the core ingot, and/or into a layer which may have been applied onto the core ingot, wherein the at least one second cladding piece at least partially, preferably completely, overlaps the first cladding piece. In this way, a plurality of cladding pieces can be disposed on top of one another in the groove, so that a plurality of cladding layers which lie on top of one another can be produced during subsequent hot rolling. The first and the at least one second cladding piece are preferably composed of different cladding materials. For example, the first cladding piece may be composed of a solder cladding material. By way of the solder cladding layer which is created from this cladding piece, an additional brazing connection between the core and the cladding layer which has been rolled from the second cladding piece may be produced.

In a further embodiment of the method the first cladding piece is composed of a first cladding material, and the second cladding piece is composed of a second cladding material which is different from the first cladding material. On account thereof, a roll-clad aluminum workpiece having two part-area cladding layers which have different properties may be produced. For example, the cladding materials may have different visual properties. Some alloys generate a comparatively matt surface, while others generate a comparatively brilliant surface. By way of a corresponding combination of the cladding materials a visually attractive, striped surface may be achieved, for example. Furthermore, different functionalities may be achieved by using different cladding materials. A brazing alloy may be used as the first cladding material for example, and a corrosion-resistant alloy may be used as the second cladding material. The aluminum workpiece produced then has good brazing properties in the region of the solder cladding layer, while having increased corrosion protection in the region of the corrosion-resistant cladding layer.

In a further embodiment of the method the first cladding piece has a first thickness, and the second cladding piece has a second thickness which is different from the first thickness. In this way, a workpiece having different cladding layer thicknesses may be achieved. On account thereof, aluminum workpieces having locally-focused particularly thick or thin cladding layers may be produced, for example. Such a workpiece could be produced only with difficulty or would be impossible to produce using conventional cladding processes.

The afore-described objects are at least in part achieved according to the invention by a roll-clad aluminum workpiece having a core of an aluminum alloy, and having at least one cladding layer of a cladding material on one side of the aluminum workpiece according to the invention in that the cladding layer extends across only a part-region of the side of the aluminum workpiece.

Such a roll-clad aluminum workpiece may preferably be produced using one of the afore-described methods. Accordingly, the afore-described methods preferably serve for producing such a roll-clad aluminum workpiece.

The roll-clad aluminum workpiece has a cladding layer of a cladding material on one side of the aluminum workpiece. This side is in particular the upper and/or the lower side of the aluminum workpiece.

The cladding layer extends across only a part-region of the side of the aluminum workpiece. This is understood to mean that, in contrast to a holohedral cladding layer, the cladding layer extends across only part of the surface of the side of the workpiece.

In particular, the core may be composed of one of the following aluminum alloys: AA 3xxx, in particular AA 3003, AA 3005, AA 3103 and AA 3105, and AA 6xxx, in particular AA 6063, as well as their respective modifications.

In particular, the cladding layer may be composed of one of the following aluminum alloys: AlSi alloys, in particular AA 4045, AA 4047, AA 4343, AA 4004 or AA 4104, in particular for solder cladding layers, AA 1050 or AA 7072, in particular for anti-corrosion cladding layers, or AA 1050 or AA 3003 for cladding layers having an improved visual appearance.

The roll-clad aluminum workpiece preferably has a thickness of at maximum 20 mm, preferably of at maximum 10 mm, more preferably of at maximum 5 mm, in particular of at maximum 1 mm. The thickness of the roll-clad aluminum workpiece is in particular preferably in the range of 0.05 mm, preferably of 0.5 mm, to 20 mm, preferably to 10 mm. The cladding layers preferably have a thickness in the range of 0.005 mm to 1 mm, preferably to 0.5 mm.

In a preferred embodiment the part-region occupies at maximum 95%, preferably at maximum 90%, in particular at maximum 85% of the entire area of the side of the aluminum workpiece. It is achieved in this way that at least a proportion of 5% or more of the side of the aluminum workpiece is non-clad. In this way, the properties of the aluminum workpiece, in particular in terms of corrosion resistance, brazeability, visual appearance, etc. may be selected to be different in a locally-focused manner. The proportion of the part-region of the entire area of the side of the workpiece is preferably adapted so as to be specific to the application. The part-region thus may also occupy only at maximum 80%, at maximum 70%, at maximum 60%, at maximum 50%, at maximum 40%, at maximum 30%, at maximum 20%, or even only at maximum 10% of the entire area of the side, for example.

If the roll-clad aluminum workpiece is produced using the afore-described method, the percentage-wise proportion of the width of the groove of the core ingot width is, in the method, preferably equal to or less than the percentage-wise proportion of the part-region of the cladding layer of the aluminum workpiece produced of the entire area of the respective side of the aluminum workpiece. The production method may in particular comprise a beading step in which a non-clad proportion of the workpiece produced by hot rolling is removed as beading scrap.

For example, if the groove width in production is at maximum 85% of the core ingot width, the part-region of the cladding layer thus may be at maximum 95% of the entire area of the respective side of the aluminum workpiece produced, for example, if a non-clad proportion of the workpiece of, for example, 10% is removed as beading scrap.

In an embodiment of the roll-clad aluminum workpiece the part-region of the side of the aluminum workpiece, across which the at least one cladding layer of the aluminum workpiece extends, has a size equal to or less than 50%, preferably equal to or less than 40%, in particular equal to or less than 25% of the entire area of the side of the aluminum workpiece. Preferably, the part-region in at least one direction of extent has a size equal to or less than 50%, preferably equal to or less than 40%, in particular equal to or less than 25% of the size of the aluminum workpiece in this direction of extent.

If the aluminum workpiece is an aluminum strip or an aluminum sheet, the part-region, across which a cladding layer of the aluminum workpiece extends, preferably has a width equal to or less than 50%, preferably equal to or less than 40%, in particular equal to or less than 25% of the width of the aluminum strip, or of the aluminum sheet, respectively.

An aluminum workpiece in which the size and/or the arrangement of the cladding layer is adapted to the respective application for which the aluminum workpiece is envisaged may be provided in the afore-described ways. In particular, negative consequences in the processing of the roll-clad aluminum workpieces, for example due to an excess of cladding material, may be avoided.

If the roll-clad aluminum workpiece has a plurality of cladding layers which in each case extend across a part-region of a side of the aluminum workpiece, each of these part-regions preferably has a size equal to or less than 50%, preferably equal to or less than 40%, in particular equal to or less than 25% of the entire area of the respective side of the aluminum workpiece. In the case of the aluminum workpiece being an aluminum strip or an aluminum sheet, each part-region, across which in each case one cladding layer of the aluminum workpiece extends, preferably correspondingly has a width equal to or less than 50%, preferably equal to or less than 40%, in particular equal to or less than 25% of the width of the aluminum strip, or of the aluminum sheet, respectively.

In an embodiment of the method the at least one cladding layer is composed of a brazing alloy, preferably of an alloy of the type AA 4xxx. In this way a roll-clad aluminum workpiece, in which the size and/or the arrangement of the solder material provided by the cladding layer can be adapted to the respective brazing application, is provided.

One further embodiment of the aluminum workpiece is obtained in that the aluminum workpiece has at least one brazing point for brazing the aluminum workpiece, that the cladding layer is a solder cladding layer, and that the part-region, across which the cladding layer extends, is adapted to the location of the at least one brazing point. On account thereof, the solder cladding layer is present only in the region of the brazing points, such that an excess of solder material or solder erosion outside the brazing points is prevented.

In a further embodiment of the aluminum workpiece, the aluminum workpiece on one side has a first cladding layer of a cladding material, and a second cladding layer of a cladding material, wherein the first cladding layer extends only across a first part-region, and the second cladding layer extends only across a second part-region of the side of the aluminum workpiece. Various regions of the surface of the aluminum workpiece can be provided by the cladding layer with various functions in this way. The first part-region and the second part-region may be mutually overlapping, congruent, or disjointed. In the case of overlapping and/or congruent part-regions, (at least partial) multi-layered cladding is possible, for example.

In a further embodiment of the aluminum workpiece, the first cladding layer is composed of a first cladding material, and the second cladding layer is composed of a second cladding material which is different from the first cladding material. In this way, an aluminum workpiece having cladding layers with different properties is provided. The cladding materials may be cladding materials having different visual properties or having different functional properties, for example. The first cladding material may be a brazing alloy, and the second cladding material may be a corrosion-resistant alloy, for example.

The afore-described object is furthermore at least partially achieved according to the invention by using one of the afore-described roll-clad aluminum workpiece for producing a brazed workpiece, in particular a folded tube. The roll-clad aluminum workpieces described may have part-area solder cladding layers on the provided brazing points, such that the amount of solder required for brazing may be provided without there being an excess of solder or the entire area having to be solder-clad.

An afore-described roll-clad aluminum workpiece is particularly suitable for producing a folded tube. To this end, the aluminum workpiece for example may have a solder cladding layer in those part-regions in which the folded tube shaped from the aluminum workpiece is to be brazed, that is to say at the base points of the wings of a type B folded tube, for example. Furthermore, a corrosion-resistant cladding layer may be applied onto the aluminum workpiece in those part-regions which form the interior space of the folded tube.

An integral multi-chamber folded tube may be produced from an afore-described clad aluminum workpiece, for example, wherein the aluminum workpiece has a solder cladding layer only in those part-regions in which external and/or internal brazing of the multi-chamber folded tube is required. On account thereof, it may also be avoided in particular that a reduction of the wall thickness on account of a solder cladding layer results in other regions.

In the following, even further embodiments 1 to 9 of the method and further embodiments 10 to 14 of the roll-clad aluminum workpiece, and one embodiment 15 of the use will be described:

1. Method for producing a roll-clad aluminum workpiece, in which a core ingot of an aluminum alloy and at least one cladding piece of a cladding material are provided, in which at least one groove is incorporated into the core ingot and/or into a layer which may have been applied to the core ingot, in which the cladding piece is inlayed into the groove, and in which the core ingot, after inlaying of the cladding piece, is hot-rolled.
2. Method according to embodiment 1, wherein the cladding piece is composed of a brazing alloy.
3. Method according to embodiment 1 or 2, wherein the cladding piece is adapted so as to exactly fit the shape of the groove.
4. Method according to one of embodiments 1 to 3, wherein the thickness of the cladding piece corresponds to the depth of the groove.
5. Method according to one of embodiments 1 to 4, wherein the cladding piece and the core ingot have a different resistance to forming, wherein the thickness of the cladding piece is preferably larger than the depth of the groove if the cladding piece has a lower resistance to forming than the core ingot, and/or wherein the thickness of the cladding piece is further preferably smaller than the depth of the groove if the cladding piece has a higher resistance to forming than the core ingot.
6. Method according to one of embodiments 1 to 5, wherein the cladding piece which is inlayed into the groove is spaced apart from the longitudinal edges of the core ingot, preferably having a spacing of at least 2 cm, in particular of at least 5 cm.
7. Method according to one of embodiments 1 to 6, in which a first cladding piece of a cladding material and a second cladding piece of a cladding material are provided, in which at least one first groove is incorporated into the core ingot and/or into a layer which may have been applied to the core ingot, in which the first cladding piece is inlayed into the first groove, in which the second cladding piece is inlayed into the first or into a second groove which is incorporated into the core ingot and/or into a layer which may have been applied to the core ingot, and in which the core ingot, after inlaying of the first and second cladding piece, is hot-rolled.
8. Method according to embodiment 7, wherein the first cladding piece is composed of a first cladding material, and the second cladding piece is composed of a second cladding material which is different from the first cladding material.
9. Method according to embodiment 7 or 8, wherein the first cladding piece has a first thickness, and the second cladding piece has a second thickness which is different from the first thickness.
10. Roll-clad aluminum workpiece, in particular produced by a method according to one of embodiments 1 to 9, having a core of an aluminum alloy, and having at least one cladding layer of a cladding material on one side of the aluminum workpiece, wherein the cladding layer extends across only a part-region of the side of the aluminum workpiece.
11. Aluminum workpiece according to embodiment 10, wherein the part-region occupies at maximum 95%, preferably at maximum 90%, in particular at maximum 85%, of the entire area of the side.
12. Aluminum workpiece according to embodiment 10 or 11, wherein the aluminum workpiece has at least one brazing point for brazing the aluminum workpiece, that the cladding layer is a solder cladding layer, and that the part-region, across which the cladding layer extends, is adapted to the location of the at least one brazing point.
13. Aluminum workpiece according to one of embodiments 10 to 12, wherein the aluminum workpiece on one side has a first cladding layer of a cladding material, and a second cladding layer of a cladding material, and that the first cladding layer extends only across a first part-region, and the second cladding layer extends only across a second part-region of the side of the aluminum workpiece.
14. Aluminum workpiece according to embodiment 13, the first cladding layer is composed of a first cladding material, and the second cladding layer is composed of a second cladding material which is different from the first cladding material.
15. Use of a roll-clad aluminum workpiece according to one of embodiments 10 to 14, for producing a brazed workpiece, in particular a folded tube.

BRIEF DESCRIPTION OF THE DRAWINGS

Further advantages and features of the invention emerge from the following description of further exemplary embodiments, reference being made to the appended drawings in which.

DETAILED DESCRIPTION OF THE INVENTION

FIG. 1 shows an exemplary embodiment of the method according to the invention. To this end, the part FIGS. 1a)-1d) show a core ingot, or an aluminum workpiece produced therefrom, respectively, at various temporal points of the method. FIGS. 1a)-1d) in each case show a plan view and a cross section (along the sectional line which is marked in the plan view in FIG. 1a).

Figure 1A:
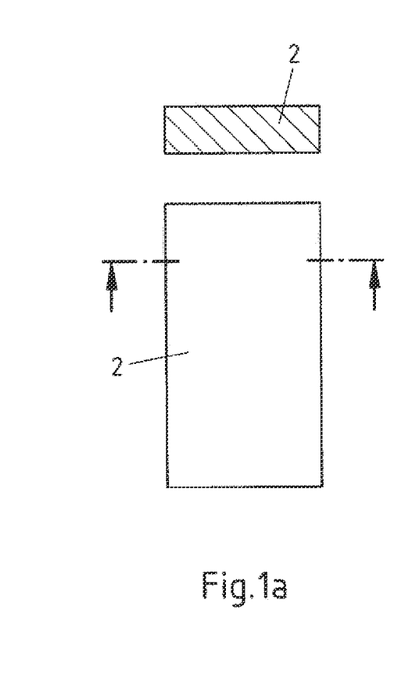
FIGS. 1a)-d) show a first exemplary embodiment of the method for producing a roll-clad aluminum workpiece, and of the roll-clad aluminum workpiece.
Figure 1B:
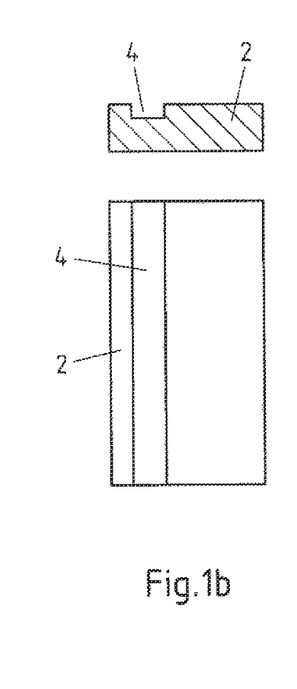

FIG. 1a) shows a core ingot 2 of an aluminum alloy, which has been provided for the method. In the present example, a groove 4 which is bilaterally continuous is milled into the core ingot 2. In FIG. 1b) the groove 4 has a rectangular shape. However, alternatively other shapes and/ or a groove which is unilaterally or bilaterally offset are/is also conceivable.

Figure 1C:
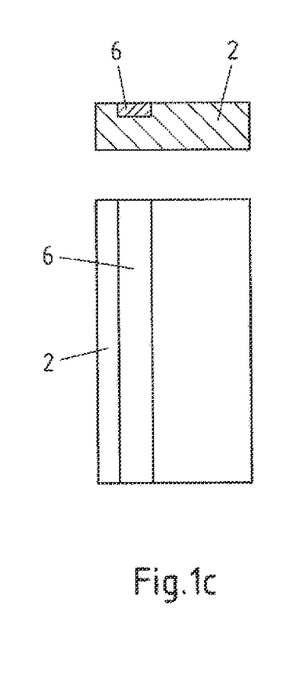

Furthermore, a cladding piece 6 of a cladding material is provided for the method, for example by being sawed from a sheet of cladding material, and is inlayed into the groove 4, as is illustrated in FIG. 1c). The cladding piece 6 is adapted to exactly fit the shape of the groove 4, that is to say that the cladding piece 6 is likewise rectangular, and the length and width of the cladding piece 6 are substantially congruent with the length and width of the groove 4. Moreover, in the present exemplary embodiment the thickness of the cladding piece 6 is congruent with the depth of the groove 4. The cladding piece 6 thus completely fills the groove 4.

Figure 1D:
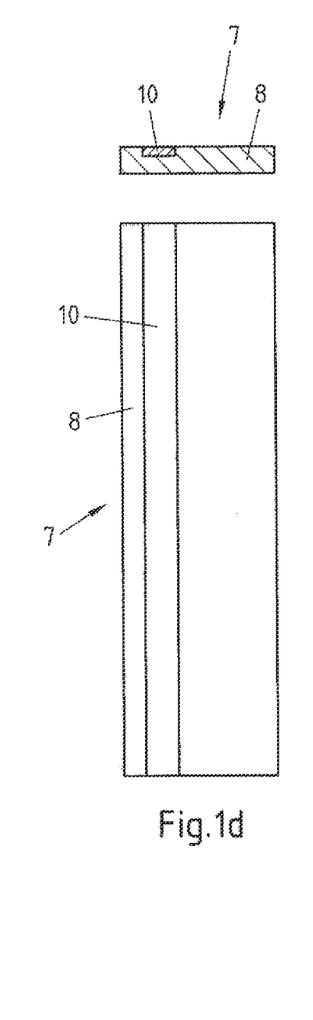

The core ingot 2 having the cladding piece 6 which is inlayed into the groove 4 is subsequently hot-rolled to form the aluminum workpiece 7 which is illustrated in FIG. 1d). On account of hot rolling, the cladding piece 6 is clad onto the core ingot 2, that is to say is connected thereto in a materially-integral, force-fitting, and/or form-fitting manner. The aluminum workpiece 7 thus has a core 8 of an aluminum alloy and a part-area cladding layer 10.

Figure 2A:
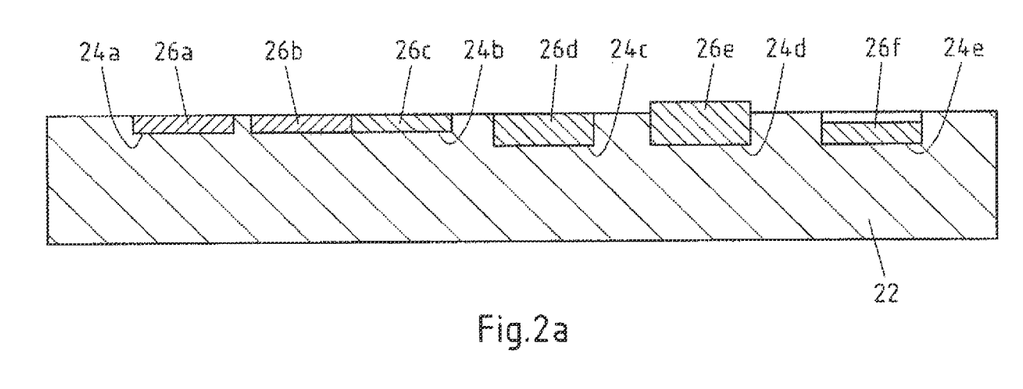
FIGS. 2a)-b) show a core ingot having cladding pieces, and a roll-clad aluminum workpiece produced therefrom, as a second exemplary embodiment of the method and of the roll-clad aluminum workpiece.
Figure 2B:
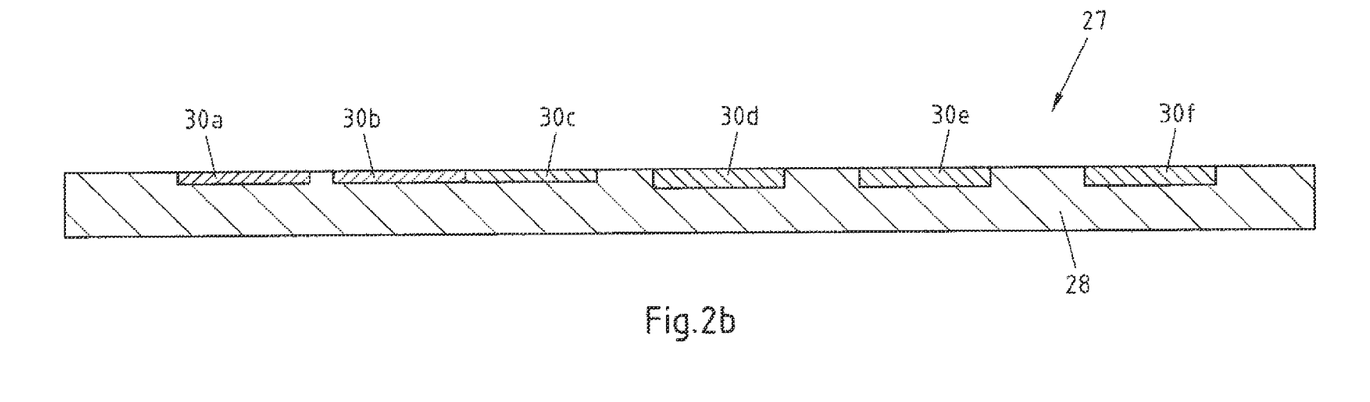

FIG. 2 shows a second exemplary embodiment of the method and of the roll-clad aluminum workpiece.

A core ingot 22 of an aluminum alloy is illustrated in cross section, so as to be transverse to the longitudinal extent of the core ingot 22, in FIG. 2a). Grooves 24a-e have been milled into the core ingot 22, into which grooves cladding pieces 26a-f have been inlayed. Subsequently, the core ingot 22 having the cladding pieces 26a-f has been hot-rolled to form the aluminum workpiece 27 which is likewise illustrated in cross section in FIG. 2b). The aluminum workpiece 27 has a core 28 of an aluminum alloy, and part-area cladding layers 30a-f which correspond to the cladding pieces 26a-f.

The grooves 24a,c,d,e, and the cladding pieces 26a,d,e,f, are measured such that the cladding pieces in each case fit exactly into the corresponding grooves. The groove 24b and the cladding pieces 26b,c are measured such that both cladding pieces fit into the groove so as to be beside one another. Furthermore, the grooves 24a,b have the same depth, such that cladding layers 30a,b,c, of equal thickness are produced. The grooves 24c,d,e, likewise have the same depth, the latter however being larger than the depth of the grooves 24a,b. On account thereof, comparatively thick cladding layers 30d,e,f, may be produced.

The cladding piece 26d has a resistance to forming which is similar to that of the core ingot 22, while the cladding piece 26e has a resistance to forming which is lower than that of the core ingot 22, and the cladding piece 26f has a resistance to forming which is higher than that of the core ingot 22. On account of the different resistances to forming, during hot rolling the cladding piece 26e having the lower resistance to forming is subjected to a larger reduction in thickness, and the cladding piece 26f having the higher resistance to forming is subjected to a smaller reduction in thickness than the core ingot 22. In order to nevertheless obtain a substantially planar surface in the aluminum workpiece 27 and in order to reduce warping during the rolling process, the thickness of the cladding piece 26e is selected to be larger, and the thickness of the cladding piece 26f is selected to be smaller than the depth of the groove. The thicknesses of the cladding layers 30d,e,f, which have been obtained from these cladding pieces 26d,e,f, are illustrated to be of similar size in FIG. 2b; however, depending on the material of the cladding piece, or of the core 28, respectively, they may also be differently sized or shaped.

In principle, the cladding pieces 26a-f may be composed of the same cladding material or of different cladding materials. The properties of the aluminum workpiece 27 may be adjusted to requirement by way of the selection of the cladding material for the individual cladding pieces 26a-f. In particular, an aluminum workpiece 27 having different locally-focused properties may be produced. For example, the cladding piece 26a may be composed of a solder cladding material, so as to produce a locally-focused solder cladding layer 30a. The cladding pieces 26b-c may have different visual properties, for example be matt and brilliant, so as to achieve a visual effect of the cladding layers 30b-c. A corrosion-resistant alloy may be used for the cladding piece 26d, for example, so as to provide a locally-focused corrosion-resistant cladding layer 30d. In principle, the combination possibilities of the various cladding materials and cladding layer thicknesses as well as of the number of cladding layers and of the arrangement of the cladding layers are unlimited.

Figure 3A:
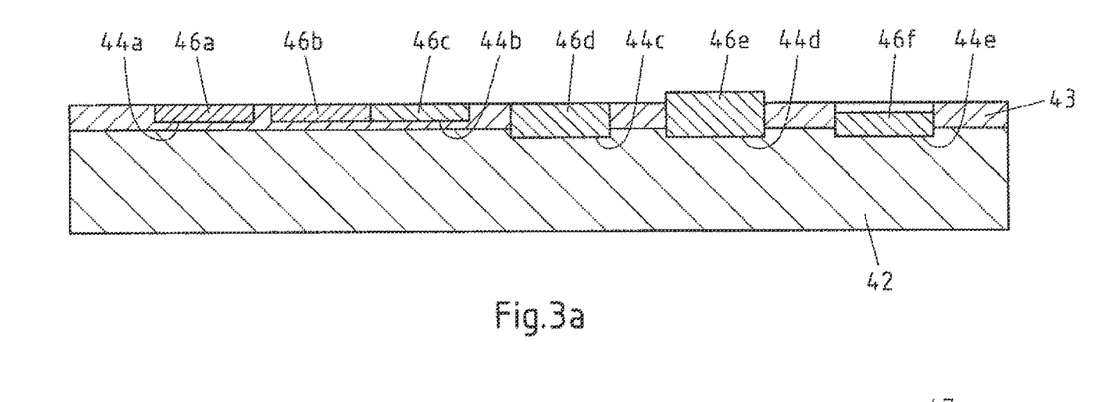
FIGS. 3a)-b) show a core ingot having a layer applied thereonto and having cladding pieces, and a roll-clad aluminum workpiece produced therefrom, as a third exemplary embodiment of the method and of the roll-clad aluminum workpiece.
Figure 3B:
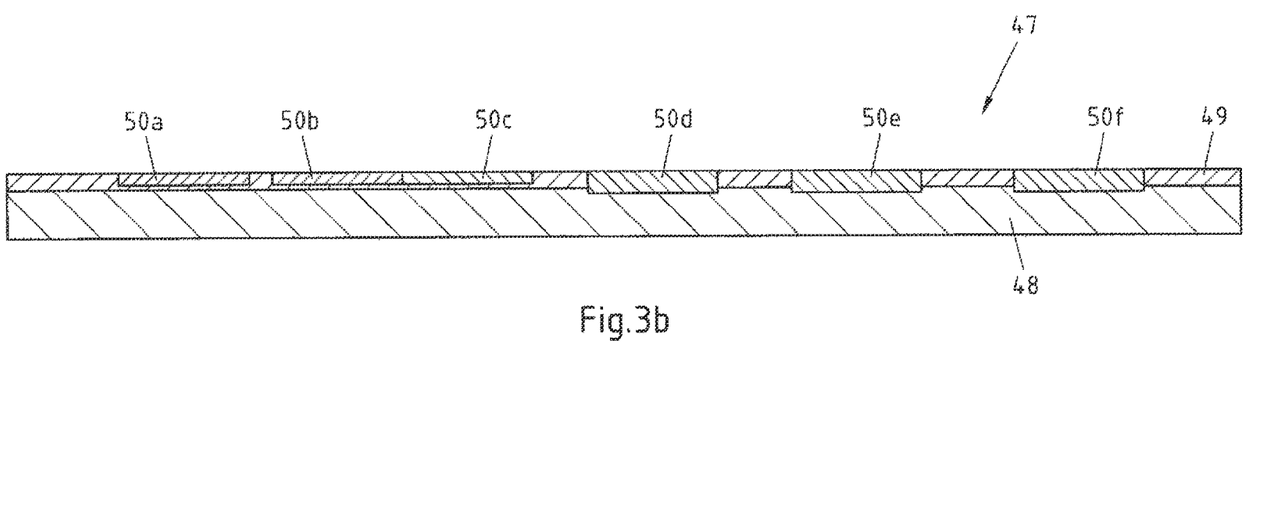

FIG. 3 shows a third exemplary embodiment of the method and of the roll-clad aluminum workpiece. The illustration corresponds to the illustration in FIG. 2.

The core ingot 42 which is illustrated in FIG. 3a differs from the core ingot 22 in FIG. 2a in that another layer 43 has been applied onto the core ingot 42. This layer 43 may be a holohedral cladding layer, which has been clad onto the core ingot 42 in a first hot-rolling pass, for example. Alternatively, the layer 43 may also be adhesively bonded or brazed onto the core ingot.

Grooves 44a-i have been incorporated into the layer 43 and/or into the core ingot 42. The depth of the grooves 44a-d here is smaller than the thickness of the layer 43, such that the grooves effectively have only been incorporated into the layer 43. In contrast thereto, the depth of the grooves 44c-e is larger than the thickness of the layer 43, such that the grooves have been incorporated both into the layer 43 as well as into part in the core ingot 42.

Cladding pieces 46a-f have been inlayed in the grooves 44a-e. The aluminum workpiece 47 which is illustrated in FIG. 3b has been produced by hot-rolling the core ingot 42 having the layer 43 and the cladding pieces 46a-f. Said aluminum workpiece 47 has a core 58 of an aluminum alloy, cladding layers 50a-f which correspond to the cladding pieces 46a-f, and a cladding layer 49 which is substantially holohedral, with the exception of the region of the cladding layers 50d-f.

The cladding layers 50a-c lie above the cladding layer 49, such that multiple cladding results here. This is also referred to as multicladding.

Figure 4A:
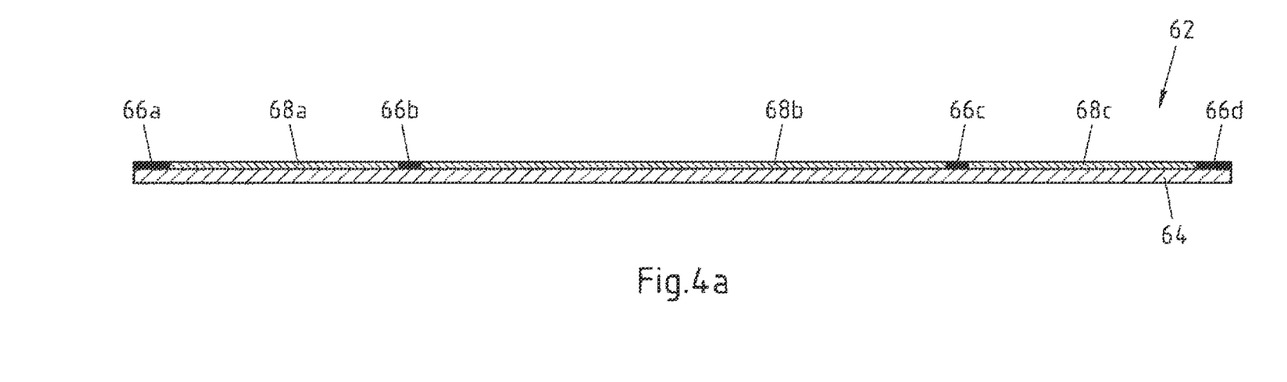
FIGS. 4a)-b) show a roll-clad aluminum workpiece and an integral multi-chamber folded tube produced therefrom as a fourth exemplary embodiment of the roll-clad aluminum workpiece, and as an exemplary embodiment of the use.
Figure 4B:
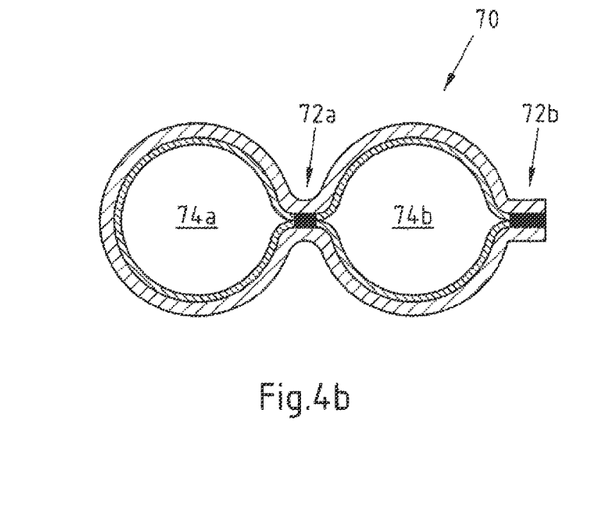

FIG. 4 shows a roll-clad aluminum workpiece and an integral multi-chamber folded tube produced therefrom as a fourth exemplary embodiment of the roll-clad aluminum workpiece and as exemplary embodiment of the use.

The aluminum workpiece 62, which in FIG. 4a is illustrated in cross section transverse to the longitudinal extent, has a core 64 of an aluminum alloy, and first cladding layers 66a-d of a first cladding material, and second cladding layers 68a-c of a second cladding material. The first cladding material is solder cladding layers, while the second cladding material is a corrosion-resistant alloy. The aluminum workpiece 62 may have been produced by one of the aforedescribed methods, for example.

The multi-chamber folded tube 70, which is illustrated in cross section in FIG. 4b, has been produced by forming the aluminum workpiece 62. The location of the first cladding layers 66a-d of the aluminum workpiece 62, that is to say of the solder cladding layers, here is precisely such that the latter in the multi-chamber folded tube 70 lie in the joint regions 72a-b, in particular in the base point of the joint region 72b. On account thereof, the multi-chamber folded tube 70 may be brazed in the joint regions 72a-b. In contrast thereto, the second cladding layers 68a-c, that is to say the corrosion-resistant cladding layers, are disposed such that they line the internal cross sections 74a-b of the multi-chamber folded tube 70. On account thereof, corrosion resistance of the multi-chamber folded tube 70 in relation to the media routed through the internal cross sections 74a-b is enhanced.

Figure 5A:
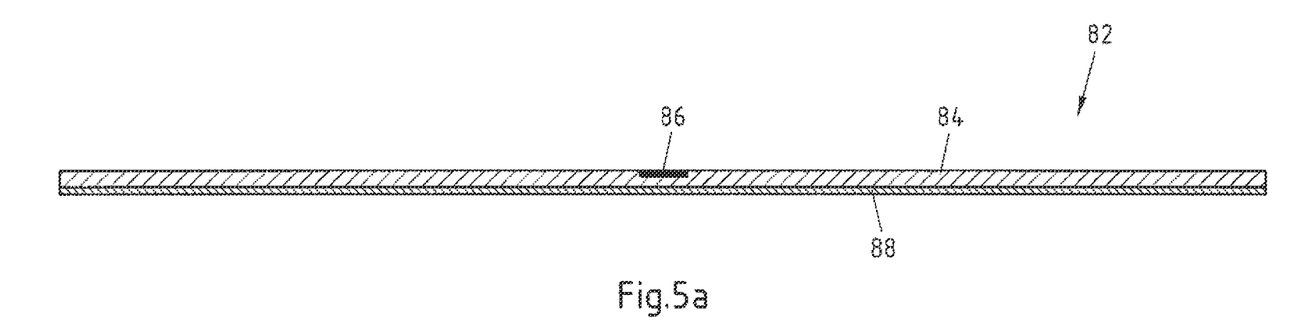
FIGS. 5a)-b) show a roll-clad aluminum workpiece and an integral multi-chamber type-B folded tube produced therefrom, as a fifth exemplary embodiment of the roll-clad aluminum workpiece, and as an exemplary embodiment of the use.
Figure 5B:
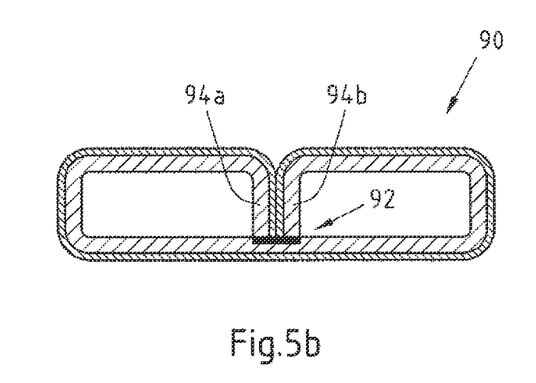

FIG. 5 shows a roll-clad aluminum workpiece and an integral multi-chamber type-B folded tube produced therefrom as a fifth exemplary embodiment of the roll-clad aluminum workpiece, and as an exemplary embodiment of the use.

The aluminum workpiece 82, which in FIG. 5a is illustrated in cross section transverse to the longitudinal extent, has a core 84 of an aluminum alloy and cladding layers 86, 88 of a solder cladding material. The part-area cladding layer 86 is disposed on one side of the core 84, and the holohedral cladding layer 88 is disposed on the other side of the core 84. The aluminum workpiece 82 may have been produced by one of the afore-described methods, for example.

The multi-chamber type-B folded tube 90, which is illustrated in cross section in FIG. 5b, has been produced by forming the aluminum workpiece 82. The location of the cladding layer 86 of the aluminum workpiece 82 here is precisely such that the latter in the multi-chamber folded tube 90 lies in the joint region 92 at the base points of the wings 94a-b. On account thereof, the base points of the wings 94a-b may be brazed to the inside of the opposite wall, without a holohedral solder coating in the interior or the application of a brazing paste being required for this purpose. Furthermore, on account of the cladding layer 88, the wings 94a-b can be brazed to one another in a two-dimensional manner at their lateral areas.

Improved workpieces, such as, for example, the multi-chamber folded tube 70 or the multi-chamber folded tube 90, may be economically produced using an aluminum workpiece such as the aluminum workpiece 62 or the aluminum workpiece 82, which on account of the cladding layers 66a-d and 68a-c or 86, respectively, which in part are of different types, has locally-focused different surface properties.

The invention claimed is:

1. A method of producing a folded tube from a roll-clad aluminum workpiece, in which a core ingot of an aluminum alloy and at least one cladding piece of a cladding material are provided, in which at least one groove is incorporated into the core ingot and/or into a layer which may have been applied to the core ingot, in which the cladding piece is inlayed into the groove, in which the core ingot, after inlaying of the cladding piece, is hot-rolled to produce a roll-clad aluminum workpiece, and in which the roll-clad aluminum workpiece is folded such that the at least one cladding piece forms a joint section with another region of the roll-clad aluminum workpiece so as to form the folded tube, wherein the width of the groove is equal to or less than 70% of the core ingot width, and wherein the cladding piece is composed of a brazing alloy.

2. The method according to claim 1, wherein the at least one cladding piece has a width equal to or less than 50% of the core ingot width.

3. The method according to claim 1, wherein the cladding piece is composed of an alloy of the type AA 4xxx.

4. The method according to claim 1, wherein the cladding piece is adapted so as to exactly fit the shape of the groove.

5. The method according to claim 1, wherein the cladding piece which is inlayed into the groove is spaced apart from the longitudinal edges of the core ingot.

6. The method according to claim 1, in which a first cladding piece of a cladding material and a second cladding piece of a cladding material are provided, in which at least one first groove is incorporated into the core ingot and/or into a layer which may have been applied to the core ingot, in which the first cladding piece is inlayed into the first groove, in which the second cladding piece is inlayed into the first or into a second groove which is incorporated into the core ingot and/or into a layer which may have been applied to the core ingot, and in which the core ingot, after inlaying of the first and second cladding piece, is hot-rolled.

7. The method according to claim 6, wherein the first cladding piece is composed of a first cladding material, and the second cladding piece is composed of a second cladding material which is different from the first cladding material.

8. The method according to claim 6, wherein the first cladding piece has a first thickness, and the second cladding piece has a second thickness which is different from the first thickness.

9. A method, comprising the steps of:
producing a folded tube from a roll-clad aluminum workpiece, the roll-clad aluminum workpiece having a core of an aluminum alloy, and having at least one cladding layer of a cladding material on one side of the aluminum workpiece, the at least one cladding layer configured to form a joint section with another portion of the roll-clad aluminum workpiece when the roll-clad aluminum workpiece is folded into a folded tube, wherein the cladding layer extends across only a part-region of the side of the aluminum workpiece wherein the part-region occupies at maximum 70% of the entire area of the side, and that the cladding layer is composed of a brazing alloy.

10. The method according to claim 9, wherein the part-region of the side of the aluminum workpiece, across which the at least one cladding layer of the aluminum workpiece extends, has a size equal to or less than 50% of the entire area of the side of the aluminum workpiece.

11. The method according to claim 9, wherein the cladding layer is composed of an alloy of the type AA 4xxx.

12. The method according to claim 9, wherein the aluminum workpiece has at least one brazing point for brazing the aluminum workpiece, that the cladding layer is a brazing cladding layer, and that the part-region, across which the cladding layer extends, is adapted to the location of the at least one brazing point.

13. The method according to claim 9, wherein the aluminum workpiece on one side has a first cladding layer of a cladding material, and a second cladding layer of a cladding material, and that the first cladding layer extends only across a first part-region, and the second cladding layer extends only across a second part-region of the side of the aluminum workpiece.

14. The method according to claim 13, wherein the first cladding layer is composed of a first cladding material, and the second cladding layer is composed of a second cladding material which is different from the first cladding material.

15. The method according to claim 1, wherein the at least one cladding piece has a width equal to or less than 25% of the core ingot width.

16. The method according to claim 1, wherein the cladding piece which is inlayed into the groove is spaced at least 2 cm apart from the longitudinal edges of the core ingot.

17. The method according to claim 9, wherein the part-region of the side of the aluminum workpiece, across which the at least one cladding layer of the aluminum workpiece extends, has a size equal to or less than 25% of the entire area of the side of the aluminum workpiece.

18. A folded tube, comprising a roll-clad aluminum workpiece having a core of an aluminum alloy, and having at least one cladding layer of a cladding material on one side of the aluminum workpiece, the at least one cladding layer forming a joint section with another portion of the roll-clad aluminum workpiece, wherein the cladding layer extends across only a part-region of the side of the aluminum workpiece wherein the part-region occupies at maximum 70% of the entire area of the side, and that the cladding layer is composed of a brazing alloy.

* * * * *